United States Patent
Cheng et al.

(10) Patent No.: US 8,023,283 B2
(45) Date of Patent: Sep. 20, 2011

(54) PORTABLE ELECTRONIC DEVICE

(75) Inventors: Shih-Tse Cheng, Tu-Cheng (TW);
Ching-Chin Pun, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 335 days.

(21) Appl. No.: 12/469,788

(22) Filed: May 21, 2009

(65) Prior Publication Data

US 2010/0142175 A1 Jun. 10, 2010

(51) Int. Cl.
*H05K 7/14* (2006.01)
*H05K 7/18* (2006.01)

(52) U.S. Cl. .................. 361/801; 361/803; 361/807

(58) Field of Classification Search .............. 361/730, 361/752, 796, 800, 807, 810, 756, 801–803
See application file for complete search history.

(56) References Cited

U.S. PATENT DOCUMENTS

| 5,255,214 | A | * | 10/1993 | Ma | 361/679.06 |
| 6,016,248 | A | * | 1/2000 | Anzai et al. | 361/679.59 |
| 6,031,714 | A | * | 2/2000 | Ma | 361/679.22 |
| 6,430,038 | B1 | * | 8/2002 | Helot et al. | 361/679.05 |
| 6,768,635 | B2 | * | 7/2004 | Lai et al. | 361/679.11 |
| 6,816,388 | B2 | * | 11/2004 | Junkins et al. | 361/801 |
| 2008/0174943 | A1 | * | 7/2008 | Hirasawa et al. | 361/681 |

* cited by examiner

*Primary Examiner* — Hung S Bui
(74) *Attorney, Agent, or Firm* — Altis Law Group, Inc.

(57) ABSTRACT

A portable electronic device includes a main body and a supporting stand. The main body defines a sliding groove. The supporting stand includes a fixed bracket assembled in the sliding groove of the main body, and a rotatable bracket rotatably connected to the fixed bracket. The fixed bracket defines a receiving groove. The rotatable bracket is received in the receiving groove of the fixed bracket at a first state, and the rotatable bracket is rotated out from the receiving groove of the fixed bracket at a second state to support the portable electronic device to stand on a flat surface.

20 Claims, 6 Drawing Sheets

PORTABLE ELECTRONIC DEVICE

BACKGROUND

1. Technical Field

The present disclosure relates to portable electronic devices and, particularly, to a portable electronic device having supporting stands.

2. Description of Related Art

With the developments of electronic technologies, portable electronic devices, such as mobile phones and personal digital assistants (PDAs) are now in widespread use, and have various functions to satisfy consumers. For example, typical portable electronic devices may be used to play music, take photographs, or watch television programs, and in such situations, the portable electronic device is desired to stand on a flat surface to facilitate better and more convenient viewing and listening capabilities.

The typical portable electronic device generally stands on the flat surface by using a typical external fixing stand. The external fixing stand includes a base seat contacting the flat surface, and a pair of elastic clamps connected to the base seat. The portable electronic device is clamped between the pair of elastic clamps, thus to be fixed on the base seat. However, it is inconvenient to use the typical portable electronic device with the above-mentioned external fixing stand, because the portable electronic device has to be assembled in the external fixing stand or disassembled from the external fixing stand repeatedly. In addition, the external fixing stand is inconvenient to carry.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Figure 1:
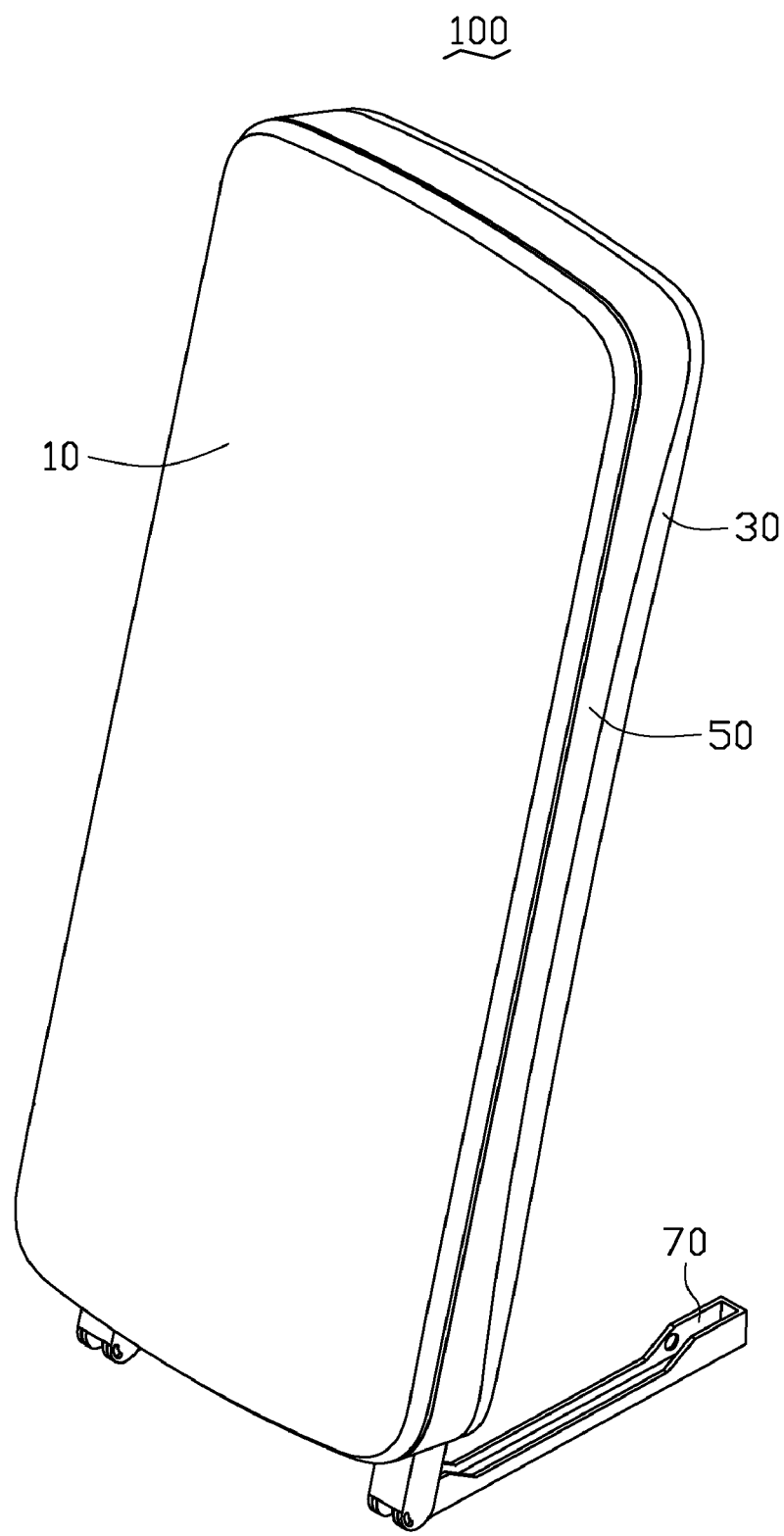
FIG. 1 is an assembled, isometric view of one embodiment of a portable electronic device, the portable electronic device including a pair of supporting stands, each supporting stand including a rotatable bracket.

Referring to FIG. 1, an exemplary embodiment of a portable electronic device 100 includes a first cover 10, a second cover 30, a main body 50 positioned between the first cover 10 and the second cover 30, and a pair of supporting stands 70 assembled in the main body 50 to support the portable electronic device 100 to stand on a flat surface (not shown).

Figure 2:
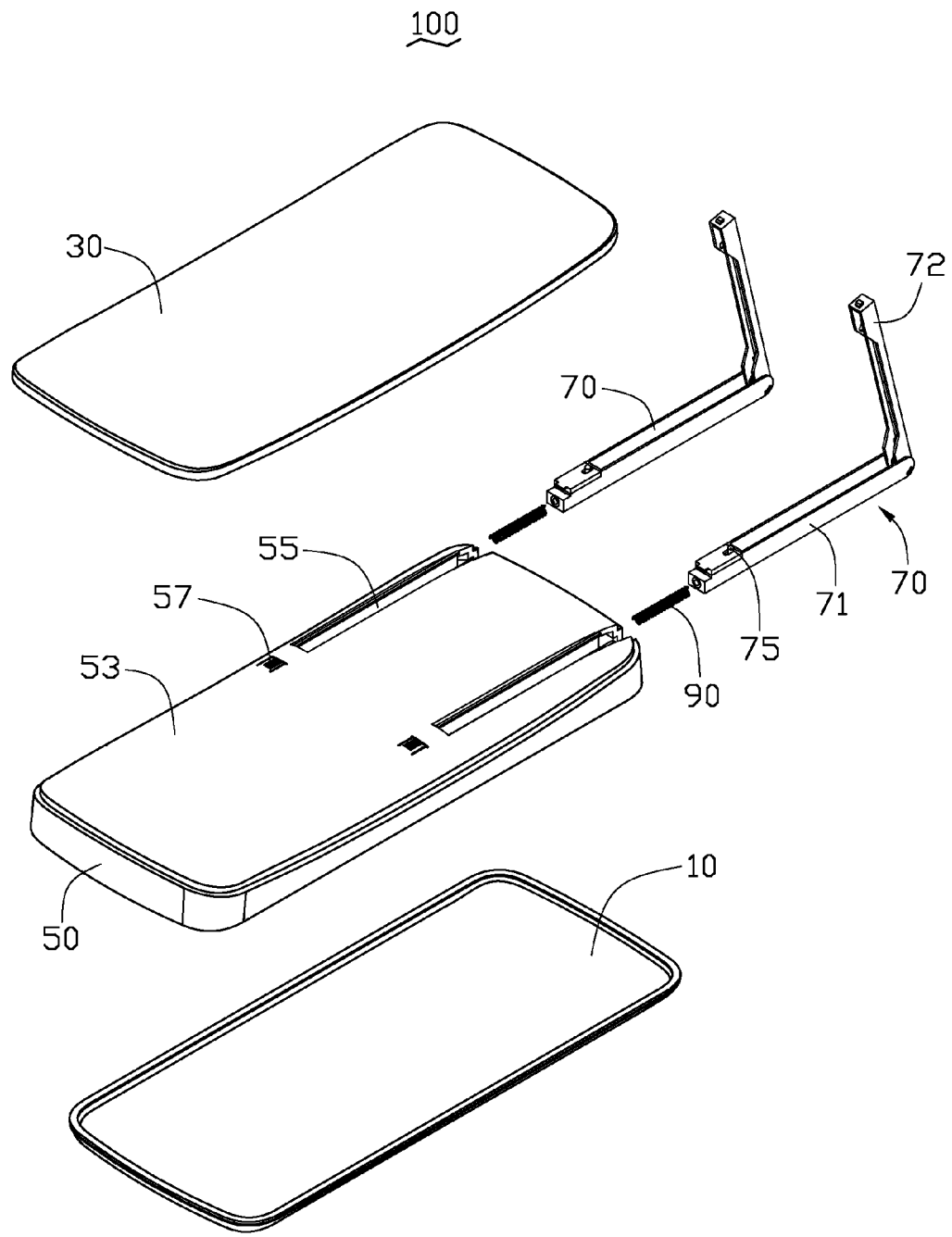
FIG. 2 is an exploded, isometric view of the potable electronic device in FIG. 1.

Referring to FIG. 2, each of the first and second covers 10, 30 is a substantially rectangular plate having four walls formed on a periphery. The first and second covers 10, 30 are respectively latched to opposite surfaces of the main body 50.

The main body 50 includes a rear surface 53, and defines two sliding grooves 55 in two ends of the rear surface 53. The two sliding grooves 55 are at opposite edges of rear surface 43 and parallel. Each sliding groove 55 is a substantially rectangular groove, and extended from a middle portion of the main body 50 to a bottom portion of the main body 50. Each sliding groove 55 has a side wall 551 (shown in FIG. 6), and defines a fixing groove 5511 (shown in FIG. 6) in the side wall 551. The main body 50 also forms two pressing portions 57 on a middle portion of the back surface 53 corresponding to the two sliding grooves 55. Each pressing portion 57 is an elastic piece extending from the back surface 53 of the main body 50 to the sliding groove 55. A latching hook 571 (shown in FIG. 6) is formed on the bottom surface of the pressing portion 57.

Figure 3:
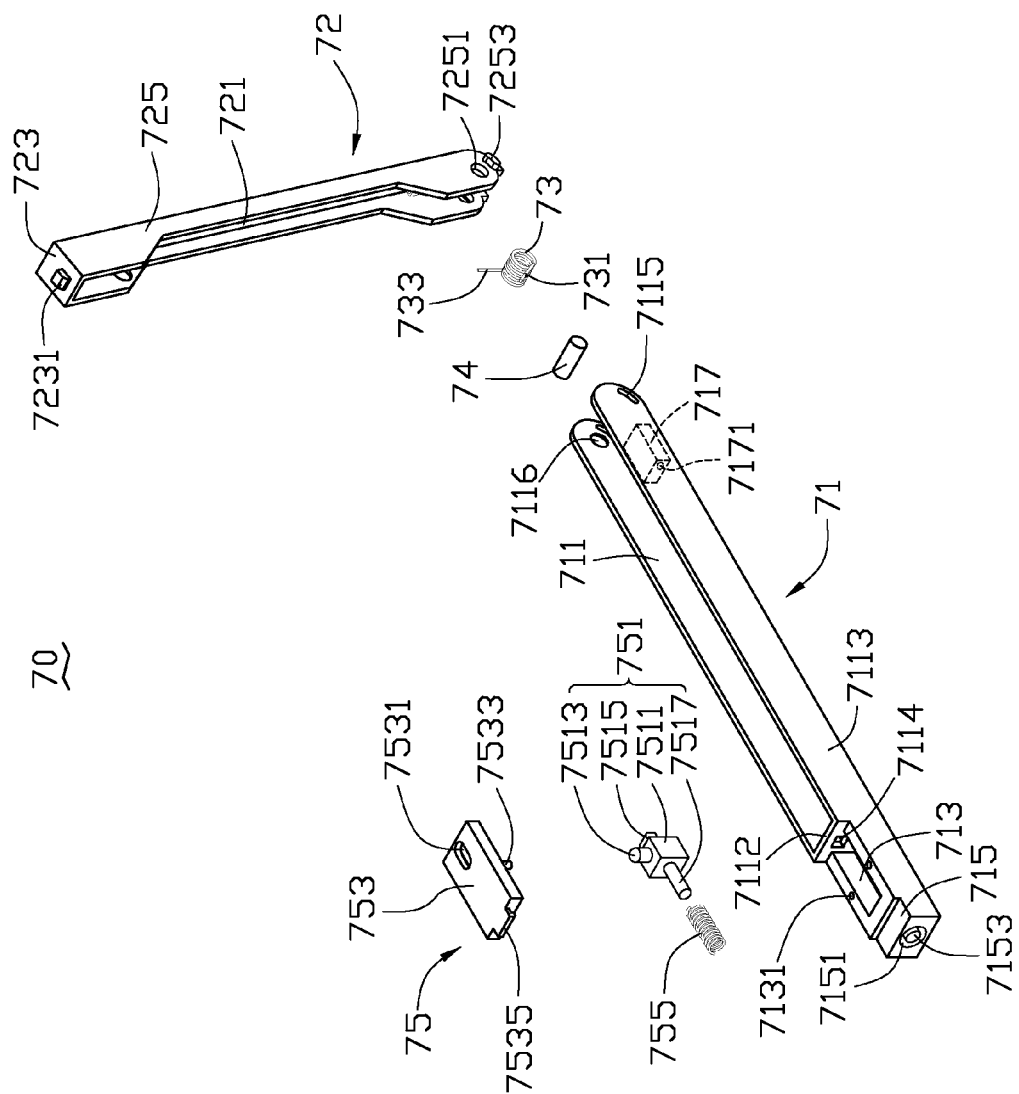
FIG. 3 is an exploded, isometric view of each supporting stand in FIG. 1.
Figure 4:
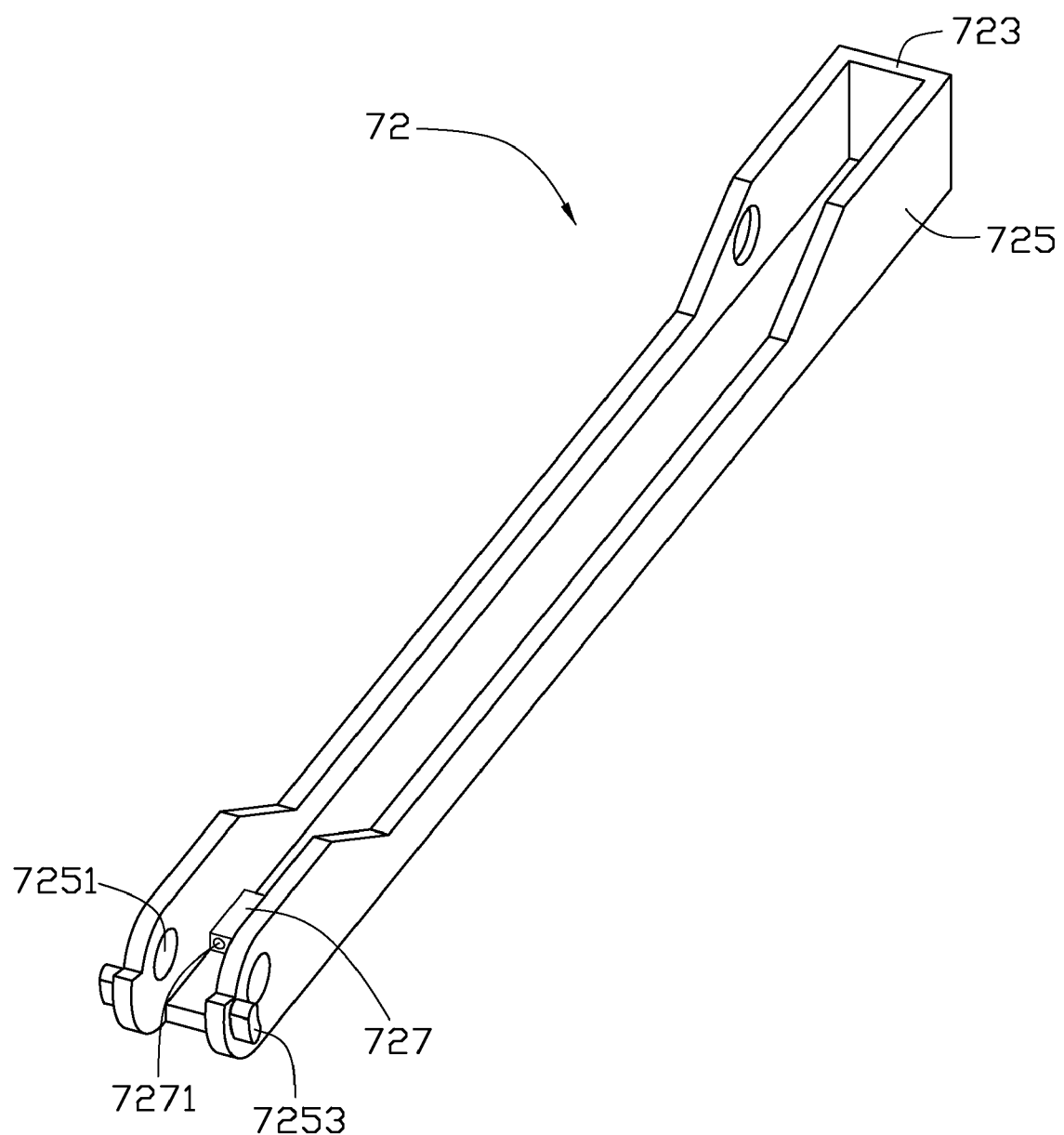
FIG. 4 is an isometric view of the rotatable bracket in FIG. 1.

Referring to FIGS. 3 and 4, each supporting stand 70 includes a fixed bracket 71, a rotatable bracket 72, a torsion spring 73, a rotatable shaft 74, and a locking module 75.

The fixed bracket 71 defines a receiving groove 711 and a mounting groove 713 adjacent to the receiving groove 711. The receiving groove 711 has a first side wall 7112, and two second side walls 7113 opposite to each other. The first side wall 7112 divides the receiving groove 711 and the mounting groove 713, and defines a through hole 7114 in the central portion. Each second side wall 7113 defines a limiting groove 7115 and a mounting hole 7116 in an end portion away from the first side wall 7112. The mounting hole 7116 is a substantially circular blind hole. The mounting groove 713 has two side walls opposite to each other. Each side wall defines a fixing hole 7131 in the top surface. The fixed bracket 71 also includes a connecting portion 715 formed on an end adjacent to the mounting groove 713. The connecting portion 715 defines an engaging groove 7151 in a side surface, and forms an engaging pole 7153 on the bottom surface of the engaging groove 7151. A first positioning block 717 is positioned in the receiving groove 711 adjacent to the mounting hole 7116. The first positioning block 717 defines a first engaging hole 7171 in a side surface.

The rotatable bracket 72 includes a first side wall 723, and two opposite second side walls 725. The first side wall 723 forms a latching protrusion 7231 on the central portion. Each second side wall 725 defines a shaft hole 7251 in an end portion away from the first side wall 723, and forms a limiting protrusion 7253 configured to slidably engage in the limiting groove 7115. A second positioning block 727 is positioned between the two second side walls 725 adjacent to the shaft hole 7251. The second positioning block 727 defines a second engaging hole 7271 in a side surface.

The torsion spring 73 includes a first latching portion 731 and a second latching portion 733 extending from the opposite ends of the torsion spring 73. The first and second latching portions 731, 733 are configured to engage in the first and second engaging holes 7171, 7271, respectively.

The rotatable shaft 74 is a substantially cylinder and configured for insertion through the torsion spring 73.

The locking module 75 includes a first locking member 751, a second locking member 753, and an elastic member 755. The first locking member 751 includes a base portion 7511, an operating portion 7513 formed on the top surface of the base portion 7511, a latching protrusion 7515 and an guiding pole 7517 formed on opposite side surfaces of the base portion 7511. The second locking member 753 defines a guiding hole 7531 in the top surface, and forms a latching hook 7535 on a side surface. The second locking member 753 also forms two fixing poles 7533 on the bottom surface to be fixed in the fixing holes 7131 of the fixed bracket 71. The elastic member 755 may be a compression spring to be sleeved on the guiding pole 7517.

The portable electronic device 100 further includes a pair of resilient members 90 (shown in FIG. 2) to connect the pair of supporting stands 70 to the main body 50. In the illustrated embodiment, the resilient members 90 are compression springs. Alternatively, the resilient members 90 may be elastic rubber rings, or cylinders.

Figure 5:
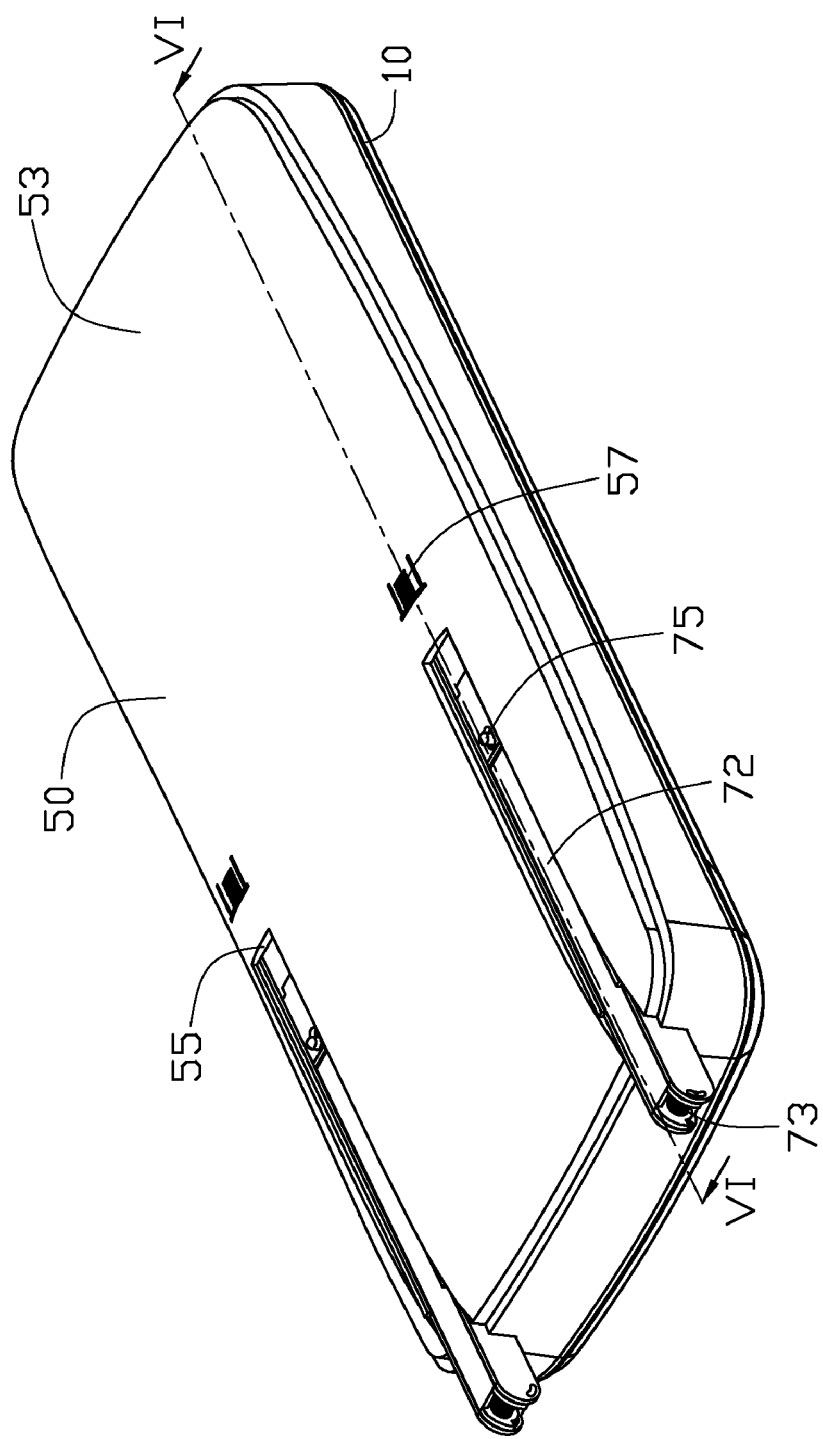
FIG. 5 is an assembled, isometric view of the potable electronic device in FIG. 1, showing the rotatable brackets received in the potable electronic device.
Figure 6:
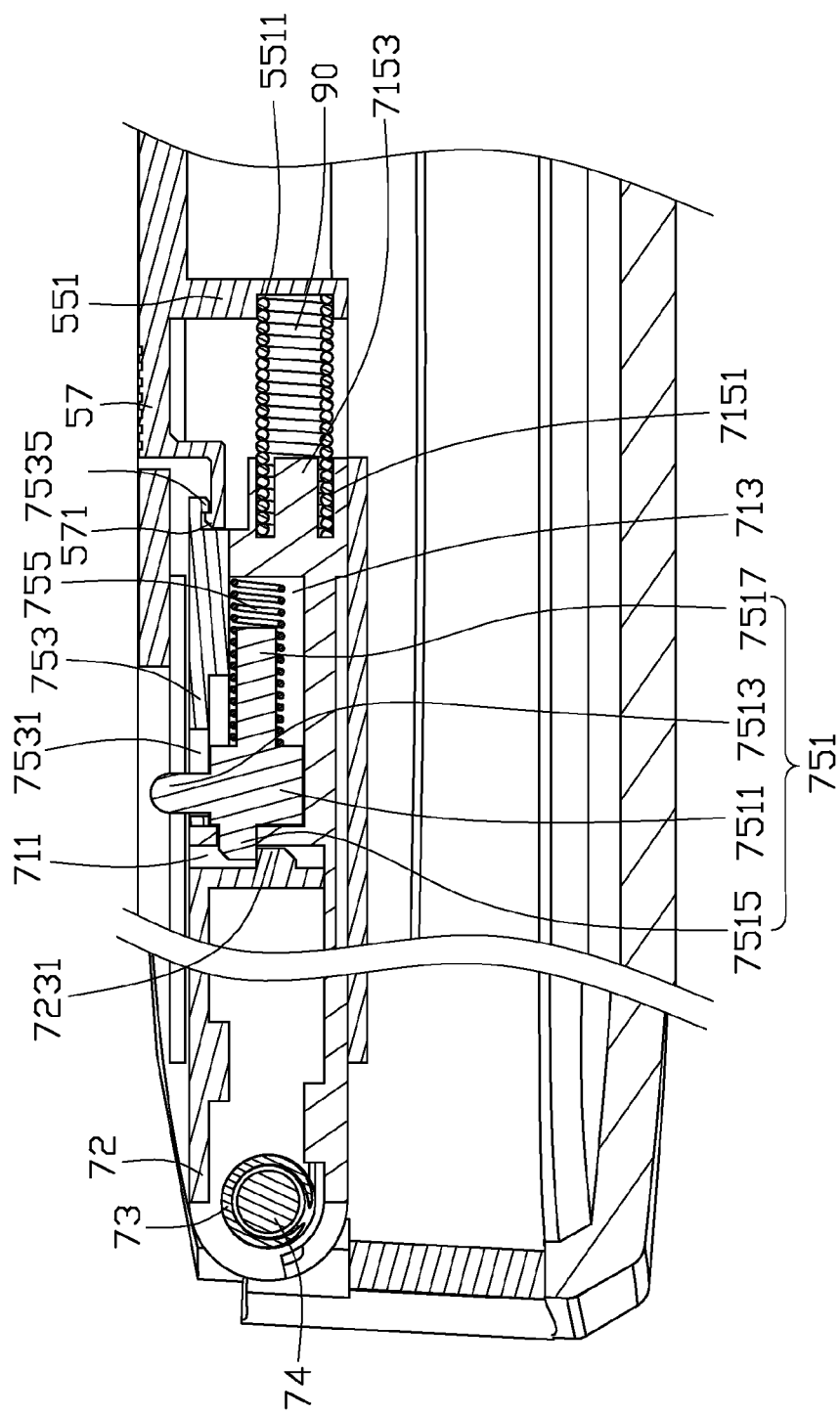
FIG. 6 is a partial, cross-sectional view of the potable electronic device in FIG. 5, taken along line VI-VI.

Referring also to FIGS. 5 and 6, to assemble each supporting stand 70, the rotatable shaft 74 is inserted through the shaft holes 7251 of the rotatable bracket 72, and two ends of the rotatable shaft 74 are engaged in the mounting holes 7116 of the fixed bracket 71. Thus, the rotatable bracket 72 is rotatable relative to the fixed bracket 71. The limiting protrusions 7253 are slidably engaged in the limiting grooves 7115, thus defining a rotatable range of the rotatable bracket 72. The torsion spring 73 is sleeved on the rotatable shaft 74, the first and second latching portions 731, 733 are engaged in the first and second engaging holes 7171, 7271 respectively. The first locking member 751 is received in the mounting groove 713. The latching protrusion 7515 is inserted through the through hole 7114. A first end of the elastic member 755 is sleeved on the guiding pole 7517, a second end of the elastic member 755 abuts a side surface of the mounting groove 713. The fixing poles 7533 are fixed in the fixing holes 7131, thus positioning the second locking member 753 on top of the first locking member 751. The operating portion 7513 is slidably inserted through the guiding hole 7531.

When each supporting stand 70 is used in the portable electronic device 100, the fixed bracket 71 is slidably assembled in the sliding groove 55 of the main body 50. A first end of the resilient member 90 is sleeved on the engaging pole 7153 of the fixed bracket 71, a second end of the resilient member 90 is fixed in the fixing groove 5511 of the main body 50. When the portable electronic device 100 does not need to stand on the flat surface, the rotatable bracket 72 is rotated around the rotatable shaft 74, until the rotatable bracket 72 is received in the receiving groove 711 of the fixed bracket 71. In such time, the torsion spring 73 is in a torsion state. The latching protrusion 7231 of the rotatable bracket 72 is latched with the latching protrusion 7515 of the first locking member 751, thus preventing the rotatable bracket 72 from disengaging from the receiving groove 711. Then the supporting stand 70 is pushed to compress the resilient member 90, until the latching hook 7535 of the second locking member 753 is engaged with the latching hook 571 of the pressing portion 57. The first and second covers 10, 30 are latched on opposite sides of the main body 50. Thus, the supporting stands 70 are hidden in the portable electronic device 100.

When the portable electronic device 100 needs to stand on the flat surface, the second cover 30 is moved away from the first cover 10, and then a user presses the pressing portion 57 of the main body 50. The pressing portion 57 moves downwards, thus triggering the latching hook 571 to disengage with the latching hook 7535, so that the supporting stand 70 can be partially moved out of the sliding groove 55, due to the elastic force generated by the resilient member 90. Then by pulling the operating portion 7513, the first locking member 751 then moves to compress the elastic member 755, thus triggering the latching protrusion 7515 to disengage with the latching protrusion 7231. The rotatable bracket 72 can now be rotated out from the receiving groove 711 of the fixed bracket 71, due to the torsion force generated by the torsion spring 73. Therefore, the portable electronic device 100 can stand on the flat surface via the supporting stands 70.

The supporting stands 70 are assembled in the main body 50 for convenience, such that no external fixing stand are required to carry out such function. Normally, the supporting stands 70 are hidden in the portable electronic device 100. In use, the support stands 70 can easily be accessed and pulled out of the portable electronic device 100, and the rotatable bracket 72 will be rotated out from the main body 50, thus enabling the portable electronic device 100 to stand on the flat surface to facilitate better and more convenient viewing and listening capabilities. Therefore, it is very convenient to use the portable electronic device 100.

In alternative embodiments, the fixed brackets 71 may be fixed in the sliding groove 55, or integrally formed with the main body 50, thus the pressing portions 57, the resilient member 90, and the latching hook 7535 of the second locking member 753 may all be omitted. It should be understood that, the portable electronic device 100 may be stood on the flat surface by using one supporting stand 70, assembled in a middle portion of the main body 50.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A portable electronic device comprising:
a main body defining a sliding groove; and
a supporting stand comprising:
a fixed bracket assembled in the sliding groove and defining a receiving groove;
a rotatable bracket rotatably connected to the fixed bracket,
a locking module releasably latching the fixed bracket to the main body and releasably latching the rotatable bracket in the receiving groove of the fixed bracket;
wherein the rotatable bracket is received in the receiving groove of the fixed bracket in a first state, and the rotatable bracket is rotated out from the receiving groove of the fixed bracket in a second state to support the portable electronic device to stand on a flat surface.

2. The portable electronic device of claim 1, wherein the supporting stand further comprises a rotatable shaft; the rotatable bracket defines a shaft hole in an end portion; the fixed bracket defines a mounting hole in an end portion; the rotatable shaft is inserted through the shaft hole of the rotatable bracket and engaged with the mounting hole of the fixed bracket.

3. The portable electronic device of claim 2, wherein the rotatable bracket forms a limiting protrusion in the end portion adjacent to the shaft hole; the fixed bracket defines a limiting groove in the end portion adjacent to mounting hole; the limiting protrusion is slidably engaged in the limiting groove, thus defining a rotatable range of the rotatable bracket.

4. The portable electronic device of claim 2, wherein the supporting stand further comprises a torsion spring sleeved on the rotatable shaft, a first positioning block positioned on the fixed bracket, and a second positioning block positioned on the rotatable bracket; each of the first and second positioning blocks defines an engaging hole; the torsion spring comprises two latching portions to be engaged in the engaging holes of the first and second engaging blocks respectively.

5. The portable electronic device of claim 1, wherein the fixed bracket further defines a mounting groove adjacent to the receiving groove; the locking module comprises a first locking member assembled in the mounting groove of the fixed bracket, the first locking member forms a first latching protrusion thereon; the rotatable bracket forms a second latching protrusion thereon to engage with the first latching protrusion.

6. The portable electronic device of claim 5, wherein the first locking member further forms a guiding pole on a side surface, and an operating portion on the top surface; the supporting stand further comprises an elastic member having a first end sleeved on the guiding pole, and a second end abutting a side surface of the mounting groove; the locking module comprises a second locking member assembled on top of the first locking member, the second locking member defines a guiding hole therein; the operating portion is slidably inserted through the guiding hole.

7. The portable electronic device of claim 6, wherein the main body forms a pressing portion having a first latching hook extending from the bottom surface of the pressing portion; the second locking member forms a second latching hook on an end to engage with the first latching hook.

8. The portable electronic device of claim 7, wherein the fixed bracket forms an engaging pole on an end; the side wall of the sliding groove defines a fixing groove therein; a first end of the resilient member is sleeved on the engaging pole, a second end of the resilient member is fixed in the fixing groove.

9. The portable electronic device of claim 1, further comprising a resilient member to connect the supporting stand on a side wall of the sliding groove.

10. A portable electronic device comprising:
a main body defining a sliding groove; and
a supporting stand comprising:
a fixed bracket assembled in the sliding groove of the main body and defining a receiving groove;
a rotatable bracket rotatably connected to the fixed bracket, and the rotatable bracket forming a first latching protrusion; and
a locking module assembled on the fixed bracket and comprising a second latching protrusion to engage with the first latching protrusion;
wherein the rotatable bracket is received and locked in the receiving groove of the fixed bracket in a first state, and the rotatable bracket is rotated out from the receiving groove of the fixed bracket in a second state to support the portable electronic device to stand on a flat surface.

11. The portable electronic device of claim 10, wherein the supporting stand further comprises a rotatable shaft; the rotatable bracket defines a shaft hole in an end portion; the fixed bracket defines a mounting hole in an end portion; the rotatable shaft is inserted through the shaft hole of the rotatable bracket and engaged with the mounting hole of the fixed bracket.

12. The portable electronic device of claim 11, wherein the supporting stand further comprises a torsion spring sleeved on the rotatable shaft, a first positioning block positioned on the fixed bracket, and a second positioning block positioned on the rotatable bracket; each of the first and second positioning blocks defines an engaging hole; the torsion spring comprises two torsion portions to be engaged in the engaging holes of the first and second engaging blocks respectively.

13. The portable electronic device of claim 10, wherein the fixed bracket further defines a mounting groove adjacent to the receiving groove; the locking module comprises a first locking member assembled in the mounting groove, and a second locking member assembled on top of the first locking member; the second latching protrusion is formed on the first locking member; the first locking member further forms a guiding pole on a side surface, and an operating portion on the top surface; the supporting stand further comprises an elastic member having a first end sleeved on the guiding pole, and a second end abutting a side surface of the mounting groove; the second locking member defines a guiding hole therein; the operating portion is slidably inserted through the guiding hole.

14. The portable electronic device of claim 10, wherein the fixed bracket forms an engaging pole on an end; a side wall of the sliding groove defines a fixing groove therein; the portable electronic device further comprises a resilient member having a first end sleeved on the engaging pole, and a second end fixed in the fixing groove.

15. A portable electronic device comprising:
a main body defining a sliding groove, and forming a pressing portion having a first latch hook; and
a supporting stand comprising:
a fixed bracket slidably assembled in the sliding groove of the main body and defining a receiving groove;
a rotatable bracket rotatably connected to the fixed bracket; and
a locking module assembled on the fixed bracket and comprising a second latching hook to engage with the first latching hook, thus locking the fixed bracket in the sliding groove of the main body;
wherein the rotatable bracket is received in the receiving groove of the fixed bracket at a first state, and the rotatable bracket is rotated out from the receiving groove of the fixed bracket at a second state to support the portable electronic device to stand on a flat surface.

16. The portable electronic device of claim 15, wherein the supporting stand further comprises a rotatable shaft; the rotatable bracket defines a shaft hole in an end portion; the fixed bracket defines a mounting hole in an end portion; the rotatable shaft is inserted through the shaft hole of the rotatable bracket and engaged with the mounting hole of the fixed bracket.

17. The portable electronic device of claim 16, wherein the supporting stand further comprises a torsion spring sleeved on the rotatable shaft, a first positioning block positioned on the fixed bracket, and a second positioning block positioned on the rotatable bracket; each of the first and second positioning blocks defines an engaging hole; the torsion spring comprises two torsion portions to be engaged in the engaging holes of the first and second engaging blocks respectively.

18. The portable electronic device of claim 15, wherein the fixed bracket further defines a mounting groove adjacent to the receiving groove; the locking module comprises a first locking member assembled in the mounting groove, and a second locking member assembled on top of the first locking member; the second latching hook is formed on the second locking member; the first locking member forms a first latching protrusion thereon; the rotatable bracket forms a second latching protrusion thereon to engage with the first latching protrusion.

19. The portable electronic device of claim 18, wherein the first locking member further forms a guiding pole on a side surface, and an operating portion on the top surface; the supporting stand further comprises an elastic member having a first end sleeved on the guiding pole, and a second end abutting a side surface of the mounting groove; the second locking member defines a guiding hole therein; the operating portion is slidably inserted through the guiding hole.

20. The portable electronic device of claim 15, wherein the fixed bracket forms an engaging pole on an end; a side wall of the sliding groove defines a fixing groove therein; the portable electronic device further comprises a resilient member having a first end sleeved on the engaging pole, and a second end fixed in the fixing groove.

* * * * *